United States Patent
Stratis et al.

(10) Patent No.: US 10,615,479 B2
(45) Date of Patent: Apr. 7, 2020

(54) ULTRA-WIDEBAND RF/OPTICAL APERTURE

(71) Applicant: Raytheon Company, Waltham, MA (US)

(72) Inventors: Glafkos K. Stratis, Tucson, AZ (US); Douglas Mills, Tucson, AZ (US); Kevin R. Hopkins, Tucson, AZ (US); Raymond A. Graffam, Tucson, AZ (US); Michael S. Smith, Oro Valley, AZ (US); David J. Knapp, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 393 days.

(21) Appl. No.: 14/971,223

(22) Filed: Dec. 16, 2015

(65) Prior Publication Data
US 2017/0179562 A1 Jun. 22, 2017

(51) Int. Cl.
| | |
|---|---|
| *H01P 3/16* | (2006.01) |
| *G02B 6/26* | (2006.01) |
| *H01Q 5/25* | (2015.01) |
| *H01P 3/08* | (2006.01) |
| *H01Q 21/06* | (2006.01) |
| *H01Q 13/24* | (2006.01) |
| *H01Q 13/06* | (2006.01) |
| *H01Q 5/22* | (2015.01) |
| *H01Q 5/47* | (2015.01) |

(52) U.S. Cl.
CPC ............... *H01P 3/16* (2013.01); *G02B 6/262* (2013.01); *H01P 3/084* (2013.01); *H01Q 5/22* (2015.01); *H01Q 5/25* (2015.01); *H01Q 5/47* (2015.01); *H01Q 13/06* (2013.01); *H01Q 13/24* (2013.01); *H01Q 21/067* (2013.01)

(58) Field of Classification Search
CPC .. H01P 3/16; H01P 3/084; H01Q 5/22; H01Q 5/25; H01Q 5/47; H01Q 13/06; H01Q 13/24; H01Q 21/067; G02B 6/262
See application file for complete search history.

(56) References Cited

U.S. PATENT DOCUMENTS

| | | | |
|---|---|---|---|
| 4,282,527 | A | 8/1981 | Winderman et al. |
| 5,471,181 | A | 11/1995 | Park |
| (Continued) | | | |

FOREIGN PATENT DOCUMENTS

EP          04049704          2/1992

OTHER PUBLICATIONS

U.S. Appl. No. 14/836,091, filed Aug. 26, 2015, Stratis, et al.
(Continued)

*Primary Examiner* — Chris H Chu
(74) *Attorney, Agent, or Firm* — Daly, Crowley, Mofford & Durkee LLP (57) ABSTRACT

An ultra-wide band (UWB) radio frequency (RF)/optical aperture includes a substrate having a plurality of regions. The plurality of regions may have varying characteristics and properties. In some embodiments, the plurality of regions includes a first region having a first relative dielectric constant and being transparent to signals having a frequency in a first frequency range, a second region contained in the first region and having a second relative dielectric constant and being transparent to signals having a frequency in a second frequency range, and a third region contained within the second region and having a third relative dielectric constant and being transparent to signals having a frequency in a third frequency range.

12 Claims, 7 Drawing Sheets

(56) References Cited

U.S. PATENT DOCUMENTS

| | | | |
|---|---|---|---|
| 5,650,793 | A | 7/1997 | Park |
| 5,872,545 | A | 2/1999 | Rammos |
| 5,977,915 | A | 11/1999 | Bergstedt et al. |
| 6,023,210 | A | 2/2000 | Tulintseff |
| 6,266,025 | B1 * | 7/2001 | Popa ........................ H01Q 1/40 333/21 R |
| 6,366,185 | B1 | 4/2002 | Keesey et al. |
| 6,456,861 | B1 | 9/2002 | Hidaka et al. |
| 6,545,572 | B1 | 4/2003 | Ohta et al. |
| 6,552,635 | B1 | 4/2003 | Sherman et al. |
| 6,801,172 | B1 | 10/2004 | Schwengler |
| 7,102,581 | B1 | 9/2006 | West |
| 7,471,175 | B2 | 12/2008 | Voss |
| 8,230,581 | B1 * | 7/2012 | Wilcoxon .............. H01Q 13/06 29/592.1 |
| 9,214,899 | B2 | 12/2015 | Plahn et al. |
| 9,405,064 | B2 | 8/2016 | Herbsommer et al. |
| 2008/0023804 | A1 | 1/2008 | Dutta |
| 2009/0158581 | A1 | 6/2009 | Nguyen et al. |
| 2012/0038539 | A1 * | 2/2012 | Chang .................... H01Q 1/422 343/872 |
| 2013/0241791 | A1 | 9/2013 | Anderson et al. |
| 2014/0266934 | A1 | 9/2014 | Cook et al. |
| 2015/0061795 | A1 | 3/2015 | Milroy et al. |
| 2015/0180203 | A1 | 6/2015 | Kinugawa et al. |

OTHER PUBLICATIONS

Shafai et al.; "Loss Reduction in Planar Circuits and Antennas Over a Ground Plan Using Engineered Conductors;" 2013 7$^{th}$ European Conference on Antennas and Propagation (EuCAP); IEEE; 2013; pp. 1020-1024.

PCT Search Report of the ISA for Int'l Appl. No. PCT/US2016/041872 dated Sep. 26, 2016; 7 pages.

PCT Written Opinion of the ISA for Int'l Appl. No. PCT/US2016/041872 dated Sep. 26, 2016; 10 pages.

Response to Oct. 26, 2016 Office Action from U.S. Appl. No. 14/836,091, filed Jan. 6, 2017; 8 Pages.

Ex Parte Quayle dated Feb. 9, 2017 from U.S. Appl. No. 14/836,091; 6 Pages.

Response to Ex Parte Quayle dated Feb. 9, 2017 from U.S. Appl. No. 14/836,091, filed Mar. 13, 2017; 6 Pages.

Notice of Allowance dated Mar. 29, 2017 for U.S. Appl. No. 14/836,091; 5 Pages.

Sipal, et al.; "Optimisation of Low Power Radio-Over-Fibre Links for UWB Systems;" 2011 IEEE International Conference on Ultra-Wideband (ICUWB); Sep. 14, 2011; pp. 600-604; 5 pages.

PCT Search Report of the ISA for PCT/US2016/030506 dated Jul. 26, 2016.

PCT Writeen Opinion of the ISA for PCT/US2016/030506 dated Jul. 26, 2016.

Office Action dated Oct. 26, 2016 from U.S. Appl. No. 14/836,091; 11 pages.

European Communication Pursuant to Article 94(3) EPC dated Dec. 5, 2018 for European Application No. 16722763.6; 6 pages.

European Response to European Office Action dated Jul. 24, 2018, for European Application No. 16751703.6; Response filed on Oct. 10, 2018; 14 Pages.

Response to European Communication Pursuant to Rules 161(1) and 162 dated Dec. 7, 2017 for European Application No. EP 16722763.6; Response filed on Apr. 12, 2018; 15 pages.

* cited by examiner

ULTRA-WIDEBAND RF/OPTICAL APERTURE

As is known in the art, there is a trend in radio frequency (RF) systems to operate with multi spectra (i.e., multi frequency) polarimetric signal processing.

As is also known, aperture radiators or array apertures (or more simply "apertures") typically operate over a very narrow range of frequencies and often at a single frequency and polarization. Such apertures are typically fed with feed circuits (e.g. a feed line, waveguide structures) which also operate over a correspondingly narrow frequency bandwidth and a single polarization selected to match the aperture polarization. Thus, conventional radiating apertures and feed circuits limit the ability to provide systems capable of multi-spectral signal processing. Additionally, conventional aperture radiators often fail to include or combine optics collocated at radio frequency (RF) apertures.

SUMMARY

In accordance with the concepts, systems, circuits and techniques described herein, it has been recognized that there is a need for an ultra-wideband (UWB) aperture having the ability to operate over multiple wavelengths or over multiple wavelength bands and/or at various polarizations. Such an aperture is suitable multirole applications in radio frequency (RF) and optical systems.

Systems having an aperture configured for UWB operation including operation at RF and optical (e.g. infrared IR) wavelengths have technological benefits in a number of areas such as target resolution and polarmetric signal processing. This is a major improvement since it allows a system to utilize RF apertures having optics/materials inserted in therein (e.g. optics disposed in the center of the RF aperture) which optics do not affect the RF aperture performance, thereby saving space, while at the same time adding multi-sensing capabilities to the system. For example, a UWB RF/optical aperture provided in accordance with the concepts, systems and techniques described herein, can be configured for target resolution to distinguish between multiple targets that are very close in either range or bearing.

In accordance with the concepts, systems, circuits and techniques described herein, a UWB RF/optical aperture includes a substrate having a first region having a first relative dielectric constant and responsive to signals having a frequency (or wavelength) in a first frequency range (or a first range of wavelengths), a second region contained within the first region and having a second relative dielectric constant and transparent to signals having a frequency in the first frequency range and responsive to signals having a frequency (or wavelength) in a second frequency range (or a second range of wavelengths), and a third region contained within the first and second regions and having a third relative dielectric constant and transparent to signals having a frequency (or wavelength) in the first or second frequency ranges and responsive to signals having a frequency (or wavelength) in a third frequency range (or a second range of wavelengths).

With this particular arrangement, an aperture responsive to signals at different frequencies/wavelengths or across different frequency/wavelength bands and/or at various polarizations is provided. Such an aperture may find use in systems operating to identify various targets at different frequencies/wavelengths and/or at various polarizations. Such an aperture may, for example, be formed at an end of a waveguide having an UWB feed circuit. Furthermore, such an aperture could be a subset of a planar or conformal aperture array in various platforms, for RADAR, communications including optical applications as well.

In one embodiment, the first region is responsive to signals in a first RF frequency range, the second region is responsive to signals in a second, and different RF frequency range the third region is responsive to optical signals; the optics region can also be considered as frequency selective structure as well. Thus, in such an embodiment, the aperture include optics collocated at a plurality of RF apertures and thus may provide multi-sensing capabilities. Frequency selectivity can also be achieved in the optical region where we may have layered dielectric materials on the top of each other, with different dielectric constants.

In one embodiment, the aperture may be provided as a UWB/optics aperture that is fed by a UWB/optical feed comprising a waveguide and optical and RF signal paths extending though the waveguide. In some embodiments, the UWB/optical feed is coupled to an optical device (lens, etc.) of the aperture. By combining a UWB/optical feed with an aperture capable of transmitting and sensing a broad range of frequencies, an antenna that supports signals at multiple frequencies/wavelengths and optical wavelengths (including infrared (IR) wavelengths), is provided. Accordingly, the UWB/optical feed method and aperture configuration described herein allows UWB spectroscopy which may result in improvements in dynamic radar cross-section (RCS) tracking which capability is not available using conventional systems.

In some embodiments, the first region corresponds to a first aperture made up of the second region and the third region and the second region corresponds to a second aperture made up of the third region.

The first relative dielectric constant of the first region may be greater than the second relative dielectric constant for the second region and the third relative dielectric constant for the third region. Furthermore, the second relative dielectric constant of the second may be greater than the third relative dielectric constant for the third region.

In an embodiment, the second region is provided within an area formed by a length and a width of the first region and the third region is provided within an area formed by a length and a width of the second region.

In some embodiments, a feed circuit may comprise a waveguide having a first end coupled to the substrate. The feed circuit can include at least one of: optical fibers, step-index fibers, or graded index fibers extending through the waveguide to at least one of the first, second or third regions of the substrate.

In some embodiments, the substrate is disposed in the first end of the waveguide such that the first surface of the substrate is flush with an open end of the waveguide (i.e. in an aperture at the end of the waveguide).

In some embodiments, the first frequency range may correspond frequencies in the range of about 10 gigahertz (GHz) to about 20 GHz, the second frequency range may correspond to frequencies in the range of about 10 GHz to about 34 GHz, and the third frequency range may correspond to frequencies greater than about 100 GHz.

BRIEF DESCRIPTION OF THE DRAWINGS

The foregoing features may be more fully understood from the following description of the drawings in which.

DETAILED DESCRIPTION

The subject matter described herein relates to an ultra-wideband (UWB) RF/optical aperture provided from a substrate having a plurality of regions. The plurality of regions are provided having varying characteristics and properties selected such that each region is responsive to (e.g. supports transmission and/or reception of) signals at a different wavelengths (related to the dimensions and the dielectric constant of that particular region) including both radio frequency (RF) and optical wavelengths. In some embodiments, the plurality of regions includes a first region having a first relative dielectric constant and dimensions responsive to signals having a frequency in a first RF frequency range in relationship to the dimensions of that particular region; the dimensions of the outer region satisfy the requirements of the lowest frequency limit (i.e. cut off frequencies) as the initial region (largest in dimensions since lower frequencies have higher (i.e. longer) wavelengths and therefore lower cut off frequencies); the outer region has the lowest frequency limit and the boundary (or perimeter) typically has the electrical characteristics of a conductive structure (e.g. a metallic structure) at those frequencies. The plurality of regions also includes a second region contained within the first region and having a second relative dielectric constant (and the corresponding dimensions) such that the second region is responsive to signals in a second frequency range while being transparent to signals in first RF frequency range (where the frequency of signals in the first frequency range are lower than the frequency of signals in the second frequency range). in this second region, in addition to the dielectric constant, the dimensions are also chosen to have certain cut off frequencies at that particular second relative dielectric constant. A third region of the plurality of regions is contained within the second region and has a third relative dielectric constant (and dimensions for cut off frequencies) and is transparent to signals having a frequency in the first and second frequency ranges and is responsive to signals having an optical wavelength.

Figure 3:
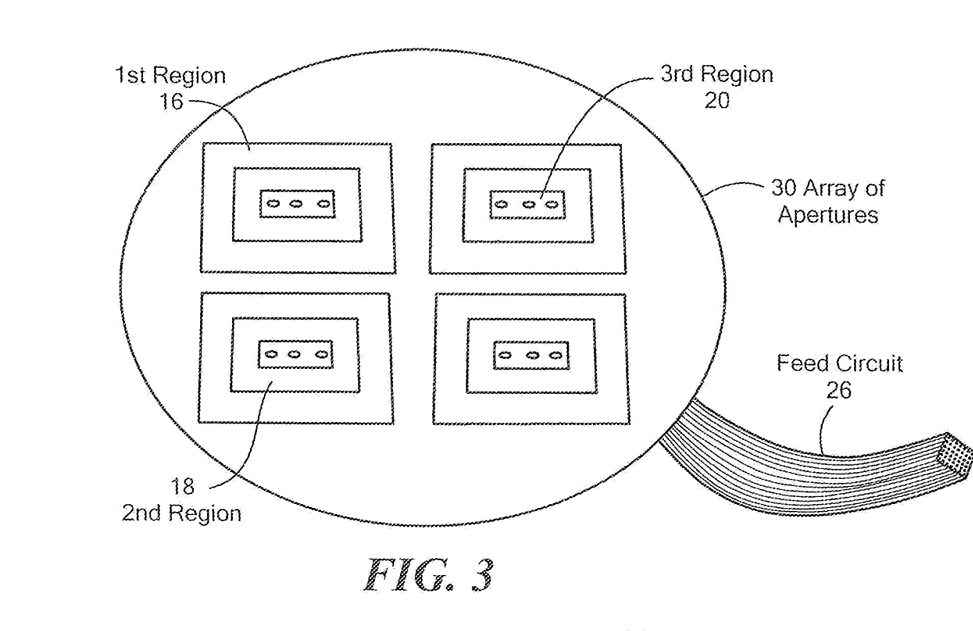
FIG. 3 is an illustration of an array of UWB/optical apertures.
Figure 3A:
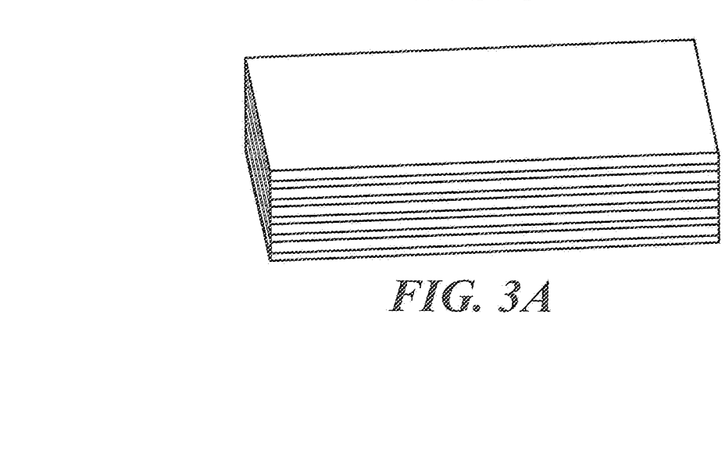
FIG. 3A is an isometric view of an optical/IR medium provided from layered dielectric materials disposed over each other with different dielectric constants to provide a multilayered structure having frequency selectivity in an optical region.
Figure 3B:
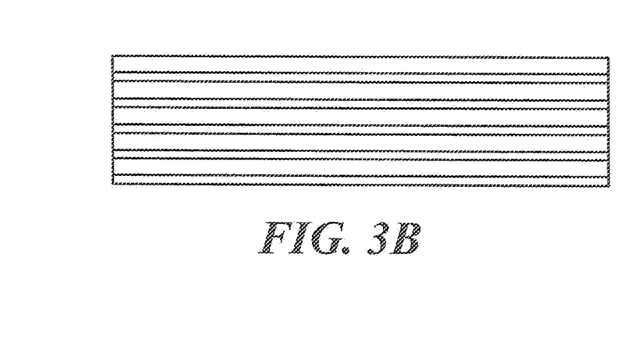
FIG. 3B is a side view of a multilayered optical selective surface provided from layered dielectric materials disposed over each other, with different dielectric constants to provide frequency selectivity in an optical region.

The aperture can be configured for ultra-wide band (UWB) operations and at least one region of the aperture may include optical/infrared (IR) structures suitable for operation with optical/IR signals; this region could also be a multilayered region (shown in FIGS. 3A, 3B). In one embodiment, the at least one region of the aperture including optics may, for example, be provided as IR or visible light optics. Inclusion of optics within the UWB aperture enables operation with signals having different polarizations (e.g. the RF signals having a first polarization and the optical signals having a second different polarization). Thus, the UWB/optical aperture enables the formation of polarimetric systems for use in multispectral applications.

Such a UWB/optical aperture may, for example, be combined with existing products, including wireless devices (e.g. relatively small wireless devices) that combine optics (e.g., cameras) and RF, as well as with optical windows formed on a radome of structures used in both commercial and non-commercial (e.g., military) applications.

Such a UWB/optical aperture also enables new areas of application such as target resolution using UWB polarmetric capabilities for radar cross section (RCS) applications. Furthermore, since the aperture supports polarimetric signals, systems utilizing such an aperture may perform UWB polarimetric spectroscopy which allows for improvements in dynamic RCS tracking and UWB pulse waveform optimization.

In one embodiment, and as will be described below, the UWB/optical aperture may be disposed in an open end of a waveguide (i.e. in an end aperture of a waveguide) which forms a portion of a UWB/optical feed circuit.

Figure 1:
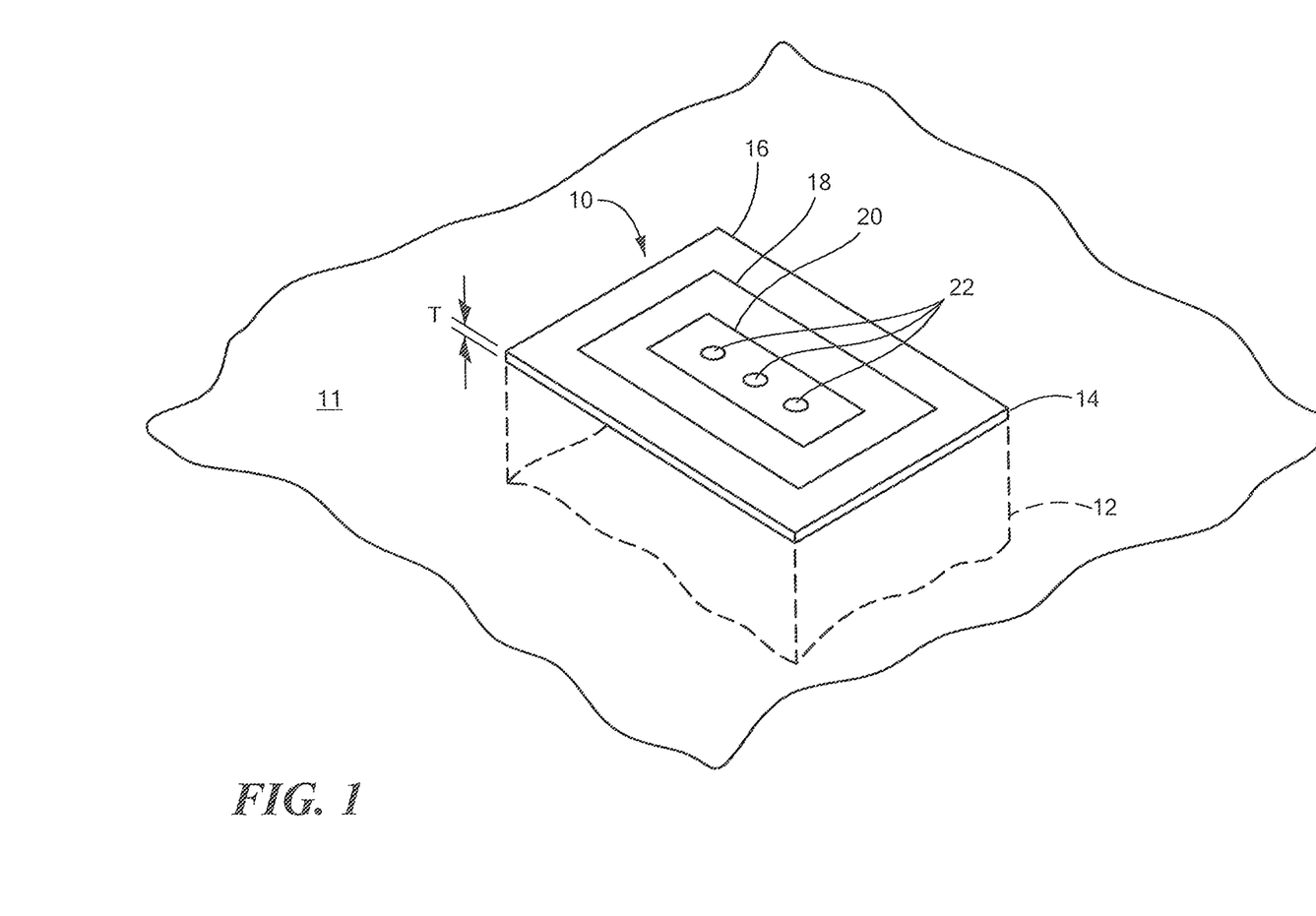
FIG. 1 is a top isometric view of an ultra-wideband (UWB)/optical aperture.
Figure 1A:
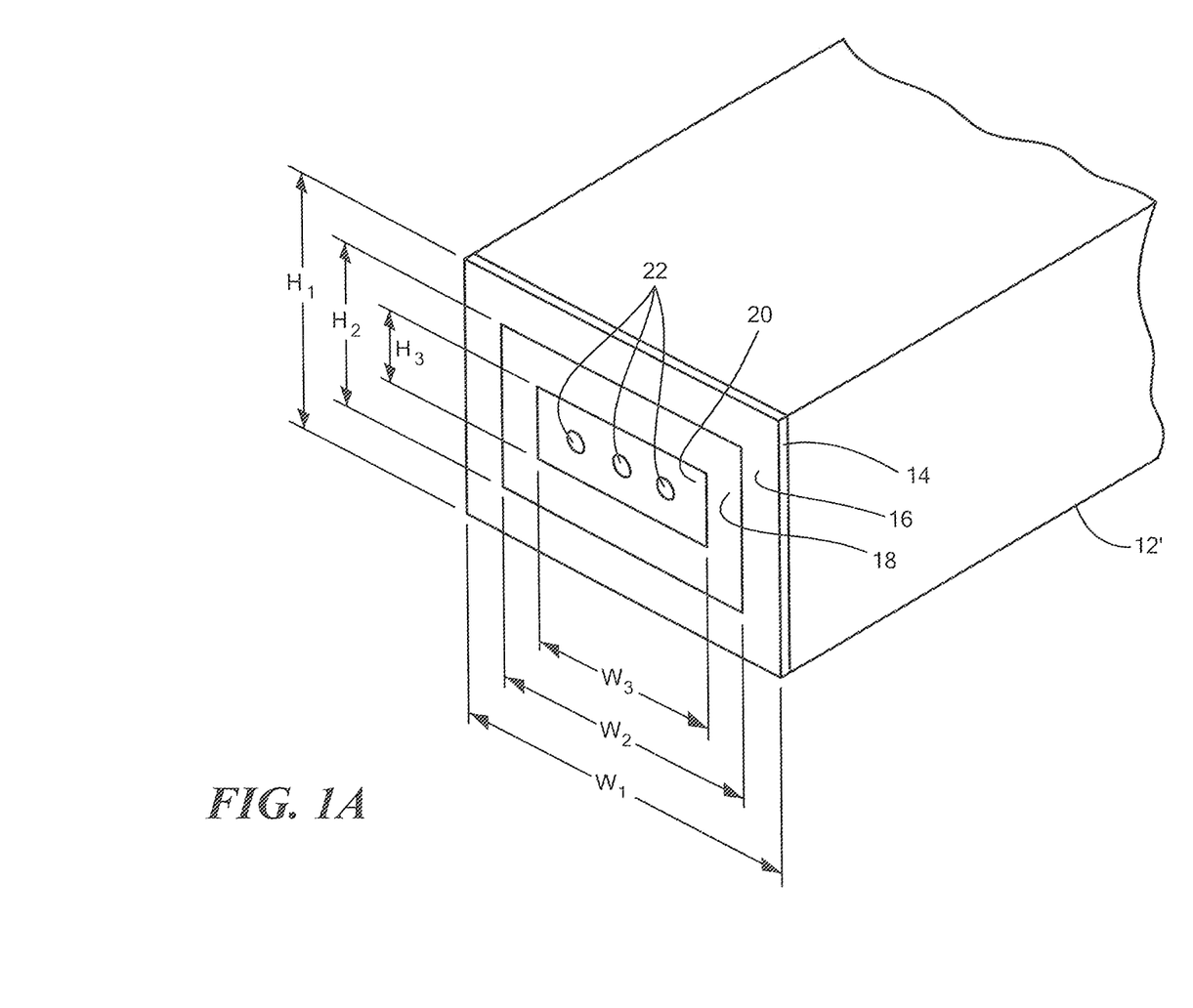
FIG. 1A is a side isometric view of the UWB/optical aperture of FIG. 1.
Figure 1B:
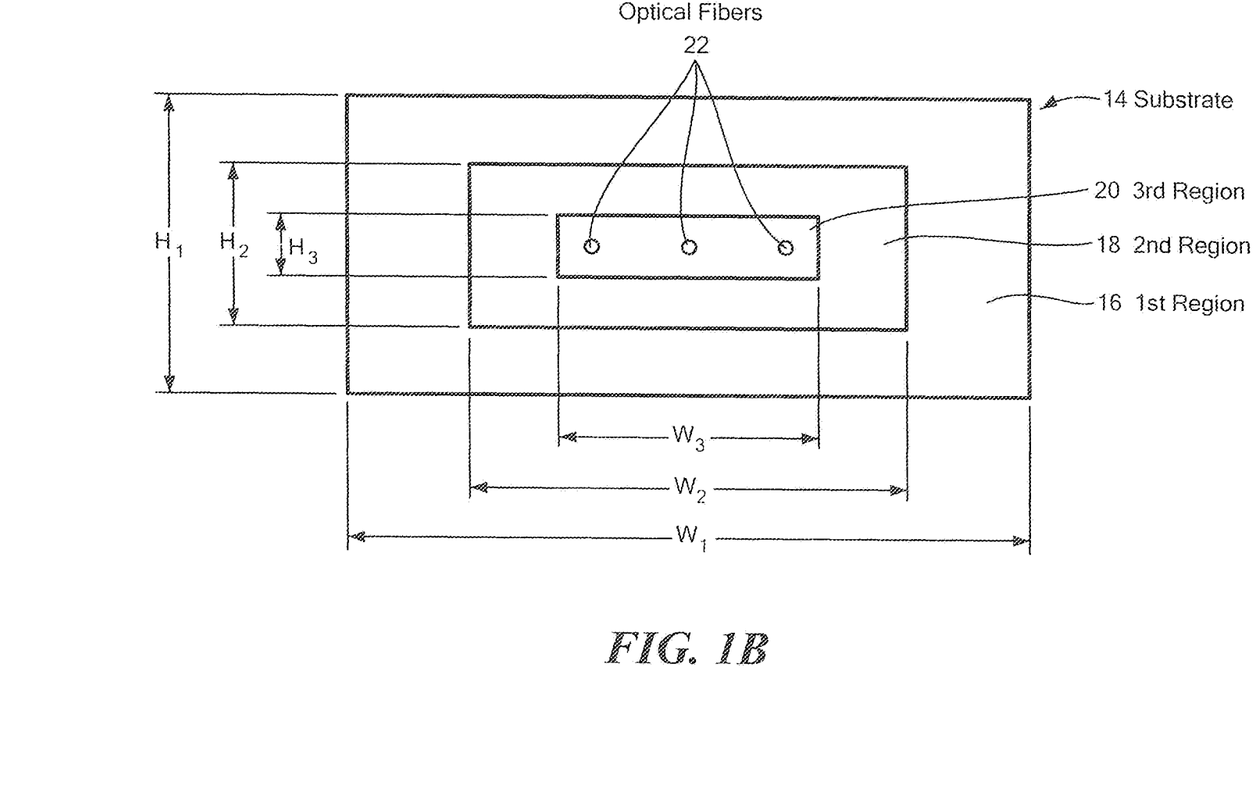
FIG. 1B is a top view of the UWB/optical aperture of FIG. 1.

Referring now to FIGS. 1-1B, in which like elements are shown having like reference numerals throughout the several views, an ultra-wide band/optical aperture 10 is formed, or otherwise provided in a conductive surface 11, which may, for example, be a ground plane. UWB/optical aperture 10 is provided from a substrate 14 having a thickness T and first, second and third regions 16, 18, 20. Aperture 10 is fed via a UWB/optical feed circuit 12 (or more simply "feed 12"), here illustrated as a UWB/optical waveguide feed. It should be appreciated that UWB/optical waveguide feed 12 is here shown in phantom since it is not properly part of aperture 10. In one embodiment, the UWB/optical feed 12 may be provided as the type described in co-pending U.S. patent application Ser. No. 14/836,091 filed on Aug. 26, 2015 and assigned to the assignee of the present application and incorporated herein by reference in its entirety.

As will be described in detail further below, aperture regions 16, 18, 20 are responsive to signals at certain frequencies/wavelengths and are transparent to signals having other frequencies/wavelengths. In particular, and as illustrated in FIGS. 1A, 1B, substrate region 16 is provided having a width W1 and a height H1 and a first relative dielectric constant and is responsive to signals having a frequency in a first RF frequency range (e.g. transmit and/or receive wavelengths of operation of a system in which the aperture is disposed); dimensions H1/W1 are designed for the cut off frequencies (lowest); at these lowest frequencies the rest of the sub regions are transparent, because of the dielectric constants of the above sub regions. Substrate region 18 is provided having a width W2 and a height H2 and a second relative dielectric constant and is substantially transparent to RF signals in the first frequency range while being responsive to signals having a frequency in a second RF frequency range (e.g. transmit and/or receive wavelengths of operation of a system in which the aperture is disposed). Substrate region 20 is provided having a width W3 and a height H3 and a third relative dielectric constant and is substantially transparent to RF signals in the first and second frequency ranges and is responsive to signals having a frequency in a third RF frequency range (e.g. transmit and/or receive wavelengths of operation of a system in which the aperture is disposed). In the illustrative embodiment of FIG. 1, one or more optical elements, generally denoted 22, are disposed in third region 20. Thus, the dimensions W1, H1, W2, H2, W3, H3 of aperture 10 as well as the dimensions and configuration of optical elements 22 are selected such that aperture 10 operates at both RF and optical wavelengths.

It should be appreciated that lossy materials are more reflective or less transparent to higher RF frequencies; that implies that they have higher conductivity and therefore act like more conductors at certain frequencies. In many cases, these lossy materials do not allow certain frequencies propagate through them. A lossy medium such as water, for example, is highly reflective to signals having high RF frequencies but allows other signals having low frequencies to propagate. Since low frequencies penetrate the water at a certain depth, submarines for example, are provided having VLF (very low frequency) antennas.

Although the concepts, structures and techniques are described herein with three (3) regions, it should be appreciated that this was done for simplicity and it should be recognized that the concepts, structures and techniques may be applied to any number of regions. In FIG. 2B, emphasis is given on the RF combined with the fiber optics waveguide in region 3. There is a conductive structure (e.g. a metallic waveguide structure and casing as well) with dimensions (W1,H1 in FIGS. 1A and 1B) based on frequency F0. In principle, these dimensions are the cut off limit (W1, H1) for the lowest RF frequencies. If it is necessary to operate at lower frequencies than F0, typically the dimensions W1, H1 would be larger. Once the lowest frequency is chosen, (e.g. F0), then the rest of dielectric apertures (regions 1, 2, 3), are chosen so they are all transparent to F0 frequency. That implies that the associated dielectric constants ($\in 3, \in 2, \in 1$) are lossless enough to let signals at frequency F0 to propagate therethrough.

Region 1: For the next frequency F1, which is higher than F0, we choose the appropriate next dielectric region (region1), which has cut off dimensions W2, H2 at F1 (frequency 1), combined with the appropriate dielectric constant $\in 1$; this dielectric constant $\in 1$ is high (lossy) enough to act almost as an electrically conductive structure (e.g. a metallic structure) for signals having a frequency F1 (frequency 1), so it behaves as a radiating aperture. At the same time, the same dielectric constant $\in 1$ is lossless (i.e. substantially transparent) to signals at a frequency of F0 (e.g. FIG. 2A).

Region 2, (FIG. 2A): In this stage, frequency F2 is higher than both F0 and F1. Furthermore, the dielectric constant $\in 2$ is high (lossy) enough (combined with W3, H3) to act as a radiating aperture for F2. Region 2 act as a lossy medium (i.e. almost as metallic structures) for F2; so aperture of region 2 radiates frequency, F2, on the same token though, both regions 1 and 2, substantially block signals at frequency F2 and that's why the aperture of region 2, acts as the radiating structure at F2. On the other hand region 3 is still transparent to F2 (and F0,F1), since it's dielectric constant is the lowest or ideally lossless; as stated above, $\in 3 < \in 2 < \in 1$.

Since the first, second and third regions 16, 18, 20 of substrate 14 are responsive to signals over a wide range of frequencies and wavelengths, the UWB/optical aperture 10 can be configured for UWB applications, including RF, infrared (IR) and optical applications. Furthermore, aperture 10 can be used to transmit and receive signals at various frequencies and at various polarizations. Thus, aperture 10 is suitable for use in multi-sensing applications.

Although illustrative aperture 10 is here shown comprised of a substrate 14 having three regions, it should be appreciated that any number of regions may be used according to a desired application. Furthermore, substrate 14 may be provided from a single material or from multiple materials bonded or otherwise secured together. Those of ordinary skill in the art will appreciate how to select the appropriate number of regions and the characteristics and properties of the various regions to meet the needs of a particular application.

In the illustrative embodiment of FIGS. 1-1B, substrate 14 is provided having multiple rectangular shapes each formed within the borders of previous ones. For example, and as illustrated in FIG. 1B, the third region 20 is positioned within the borders of the second region 18 and the second region 18 is positioned within the borders of the first region 16. Thus, region 18 is provided within an area formed by a length and width of region 16. Similarly, region 20 is provided within an area formed by a length and a width of region 18. Accordingly, in some embodiments, aperture region 16 includes second region 18 and third region 20. Similarly, aperture region 18 includes an aperture made up of third region 20. It should, of course, be appreciated that the organization, shapes, and patterns of the various regions 16, 18, 20 may be in many different forms according to the needs of a particular application.

Referring now to FIG. 1A, UWB/optical aperture 10 is disposed in an open end (or aperture end) of a UWB/optical waveguide feed circuit 12'. In one embodiment, the UWB/optical feed 12' may be provided as the type described in co-pending U.S. patent application Ser. No. 14/836,091 filed on Aug. 26, 2015 and assigned to the assignee of the present application.

Feed circuit 12' includes both optical and RF signal paths ((e.g. comprising both optical and RF substrate materials) disposed in an RF waveguide. Feed circuit 12' thus supports the RF and optical wavelengths (including optical/IR wavelengths) supported by aperture 10. Including an optical substrate in the waveguide widens the frequency bandwidth over which the RF portion of the feed operates and makes the RF feed portion UWB. In one embodiment, the UWB/optical waveguide feed 12' circuit comprises a waveguide having dimensions selected to propagate radio frequency (RF) signals; a suspended air stripline (SAS) signal path comprising a substrate having first and second opposing surfaces and a conductor disposed over a first one of the first and second opposing surfaces; a (SAS) signal path disposed in said waveguide; a multi-layer dielectric substrate with each layer being provided from a material having a relatively low relative dielectric constant, said multi-later dielectric substrate having a first surface disposed over the conductor of said SAS signal path and second, opposite surface; conductor layers disposed between at least a pair of dielectric substrates which make up said multi-layer dielectric substrate; and an optical substrate which forms an optical waveguide, said optical substrate disposed over the second surface of said multi-layer dielectric substrate.

In some embodiments, a protective layer surrounds portions (i.e., walls) of the waveguide 12, such as an external metallic shield (e.g. an electrically conductive or metallic structure which could be either act as a metallic cavity (a metallic wall) or directly be a part of a (metallic waveguide) waveguide. In practice, a metallic aperture that radiates at the lowest frequency because of the dimensions (cut off frequencies etc) is used. These apertures are usually sitting on metallic (resonant) boxes.

Each of the regions, 16, 18, 20 support propagation of signals having different frequencies/wavelengths or ranges of frequencies/wavelengths. As noted above, the first region 16 may have a first relative dielectric constant and be responsive to signals having a frequency in a first frequency range. The second region 18 may have a second relative dielectric constant and be responsive to signals having a frequency in a second frequency range. The third region 20 may have a third relative dielectric constant and be responsive to signals having a frequency in a third frequency range. It should, of course, be appreciated that in some embodiments, it may be desirable or necessary for each of the aperture regions to be responsive to signals having the same frequency or signals in the same range of frequencies.

In some embodiments, different regions 16, 18, 20 may operate over overlapping frequency ranges and threshold frequencies. In one illustrative embodiment, an outermost region (e.g., first region 16) may be responsive to signals having a relatively low frequency and other regions (e.g., second region 18, third region 20) that are positioned within the outermost region may be responsive to signals having a frequency higher than the frequency to which the first region is responsive.

In some embodiments, a middle region (e.g., second region 18) may be responsive to signals having a frequency between the lowest and highest frequencies of the respective first and third regions.

The varying responsiveness and transparency characteristics and properties of each of the regions allows for the transmission and sensing of signals at multiple different frequencies and the inclusion of optical elements allows for the transmission and sensing of signals at multiple different polarizations.

The dimensions of the opening (or aperture) in the end of waveguide 12' is selected to accommodate the substrate 14 such that substrate 14 may be disposed in the end of the waveguide 12' in a "press-fit" fashion. The width and height dimensions of the interior of the waveguide 12' in which substrate 14 is disposed establish the lowest frequency (referred to as a cut-off frequency $F_0$) signal which may propagate in the waveguide 12' as well as the dominant mode which will propagate in the waveguide 12', as is generally known. In one embodiment, these dimensions can be associated with an outer border (or perimeter) of aperture 10 (which is the same as the outer dimensions (width, height) of the substrate 14.

In some embodiments, first region 16 has an outer border having an outer width $W_1$ and an outer height $H_1$ and an inner border having an inner width $W_2$ and an inner height $H_2$, with the area between the outer and inner borders having a relative dielectric constant of $\in_{r1}$.

Similarly, second region 18 has an outer border having an outer width $W_2$ and an outer height $H_2$ and an inner border having an inner width $W_3$ and an inner height $H_2$, with the area between the outer and inner borders having a relative dielectric constant of $\in_{r2}$.

In an embodiment with three regions, third region 20 may have an outer border having an outer width $W_3$ and an outer height $H_3$ and have a rectangular shape. Third region 20 may be configured to be transparent to RF frequencies and have a low relative dielectric constant as compared with a relative dielectric constant of the first and second regions 16, 18 or have the lowest permittivity or relative dielectric constant, $\in_{r3}$, as compared to the other regions 16, 18 of the substrate 14 ($\in 3 < \in 2 < \in 1$).

RF signals may propagate through substrate 14 and be coupled to the feed circuit that is integrated into the waveguide 12'. In some embodiments, the transmitted frequencies could be selected uniquely as $F_0$, $F_1$ and $F_2$, or transmit a range of frequencies can be transmitted through the UWB/optical feed waveguide 12'. Each of the first, second, and third regions 16, 18, 20 can be configured to allow only specific frequencies such as, $F_0$, $F_1$ and F, according to their respective characteristics and properties. For example, in one embodiment in which third region 20 is transparent to RF frequencies, a band of RF frequencies can be transmitted through the UWB/optical waveguide feed circuit 12' with third region 20 responsive only to optical wavelength and transparent RF frequencies and with the first and second regions 16, 18 being responsive to RF frequencies.

In some embodiments, third region 20 includes optical portion 22 such as an optical device or optical filter. The optical portion 22 of third region 20 can be fed from a feed circuit that extends through waveguide 12 to a surface of third region 20. The feed circuit may include at least one of: waveguide lines, optical pipes, optical fibers, step-index-fibers, or graded index fibers that are integrated into the waveguide 12. Frequency selective surfaces such as multi-layered bandgap crystals (FIGS. 3A, 3B) may also be used. The feed circuit 12' is configured for use in both UWB and optical/IR application. The feed circuit can support signals at multiple frequencies/wavelengths (including optical/IR wavelengths).

In some embodiments, optical portion 22 is the only portion of the substrate 14 having a physical connection to the feed circuit (e.g., via optical fibers). The optical fibers may be selected having dimensions that support different optical frequencies and different polarizations. Thus, each optical fiber can carry different optical frequencies, wavelengths, and polarizations from another optical fiber extending through the waveguide 12 to a surface of third region 20. For example, in one embodiment having three optical fibers coupled to the feed circuit and extending to a surface of third region 20, a band of RF frequencies can be transmitted through the waveguide 12 and filter through only three RF frequencies through the substrate 14.

Figure 2:
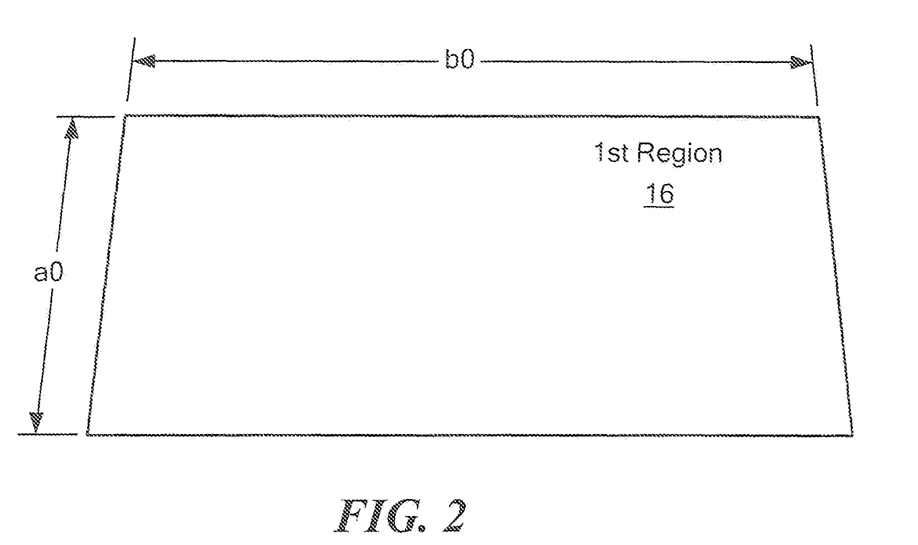
FIGS. 2-2C are top views of various regions of the UWB/optical aperture of FIGS. 1-1B.
Figure 2A:
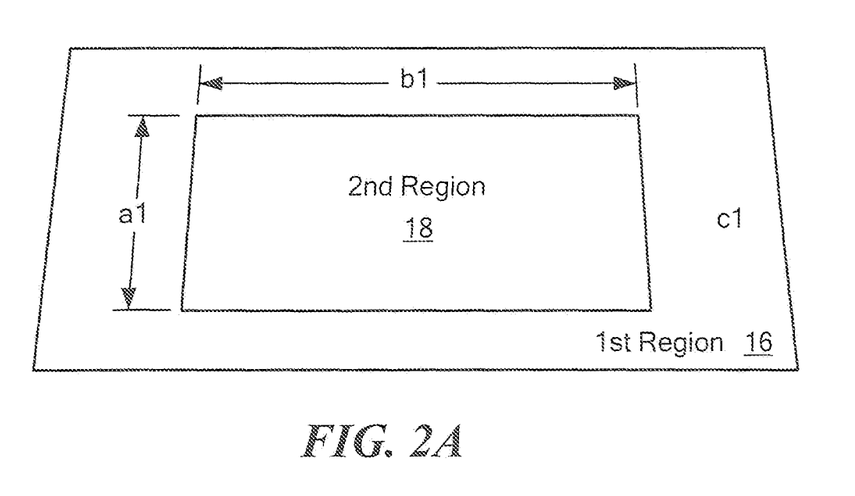
Figure 2B:
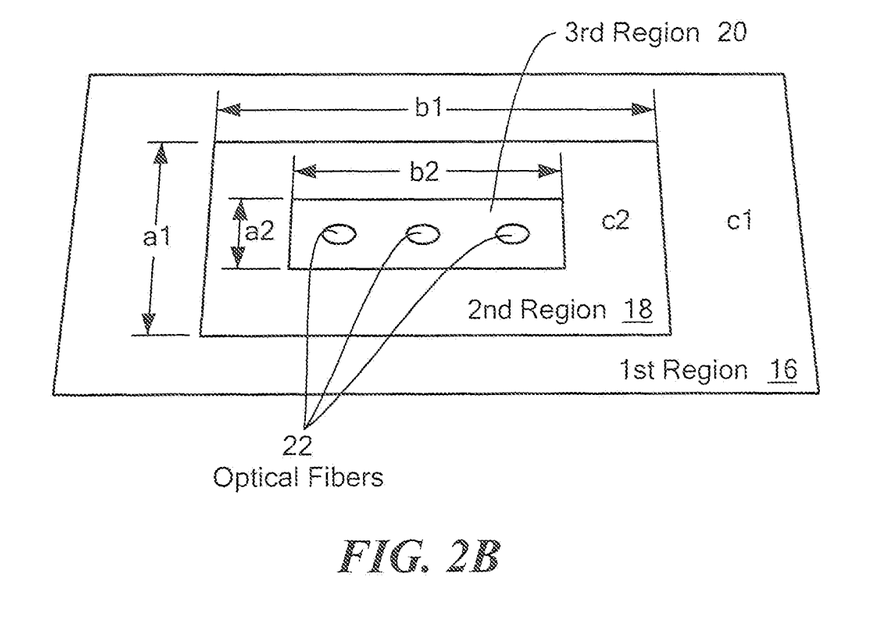
Figure 2C:
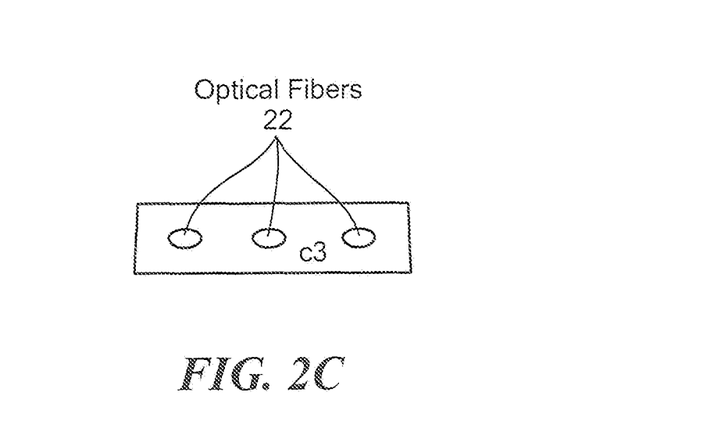

Now referring to FIGS. 2-2C, in which like elements of FIGS. 1-1B are provided having like reference designations throughout the several views, each of the regions 16, 18, 20 of the substrate 14 may be formed based on the characteristics and properties of a neighboring or adjacent region. In some embodiments, the substrate 14 includes lossy materials that are more reflective or less transparent to higher RF frequencies and have a higher conductivity and therefore act like more conductors at certain frequencies. The lossy materials may not allow certain frequencies to propagate through a surface of the substrate 14.

Now referring to FIGS. 3-3B, the ultra-wide band/optical aperture 10 of FIGS. 1-2C may be provided as an array of ultra-wide band/optical apertures 30. Each of the apertures 10 includes first, second, and third regions 16, 18, 20 and an optical portion 22 extending though a surface of third region 20.

In some embodiments, the array 30 can be added to existing technology for various types of communication, radar, direction-finding systems as well as in other multi-function RF systems. The array 30 can be combined within an optical window on a radome of such a system. The optical fibers and materials of the array 30 do not interfere with the RF of a main antenna of such a system and the array 30 can be fed from feed circuit 26. For example, in an embodiment with an array of four apertures 10, the optical portion 22 of each of the apertures 10 can be coupled to a feed circuit including a quad detector that is disposed within the body of various types of communication, radar, direction-finding systems as well as in other multifunction RF systems.

In some embodiments, such as semi-active laser seeker applications, the array 30 can be integrated into a missile for designation of a specific target that the missile (i.e., RF guided missile) should strike. For example, the array 30 can be included in a radome of a missile nose (i.e., tip). This technology increases precision of the guidance. The frequency selective aperture allows for the passage of the laser towards the intended target to illuminate the intended target and allows for strategic air-launched (SAL) missile mode and flexible and fast reaction targeting. Furthermore, the frequency selective aperture provide an improved RF beam pattern with the top modification leveraged for SAL mode.

As illustrated in FIGS. 3A, 3B, frequency selectivity can be achieved in the optical region in which layered dielectric materials are disposed on the top of each other, with different dielectric constants. The frequency selective surfaces maybe provided, for example, as multilayered bandgap crystals.

Figure 3C:
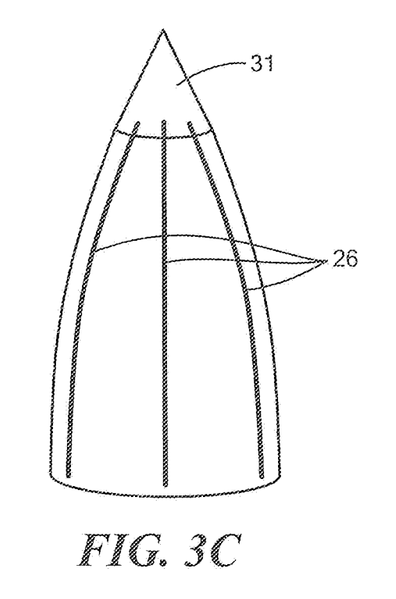
FIG. 3C is a side view of a radome portion of a missile which includes an optical window and an array of RF/optical apertures such as showing in FIG. 3.

FIG. 3C is a side view of a radome portion of a missile which includes an optical window 29. The radome is disposed over an array of RF/optical apertures (not visible in FIG. 3C) which may be the same as or similar to the array of RF/optical apertures shown in FIG. 3. Also disposed inside the radome are one or more fiber optics-waveguides 26 may be disposed on an internal surface of the radome. In one embodiment, the fiber optics-waveguides may be disposed on an internal surface of the radome.

Figure 4:
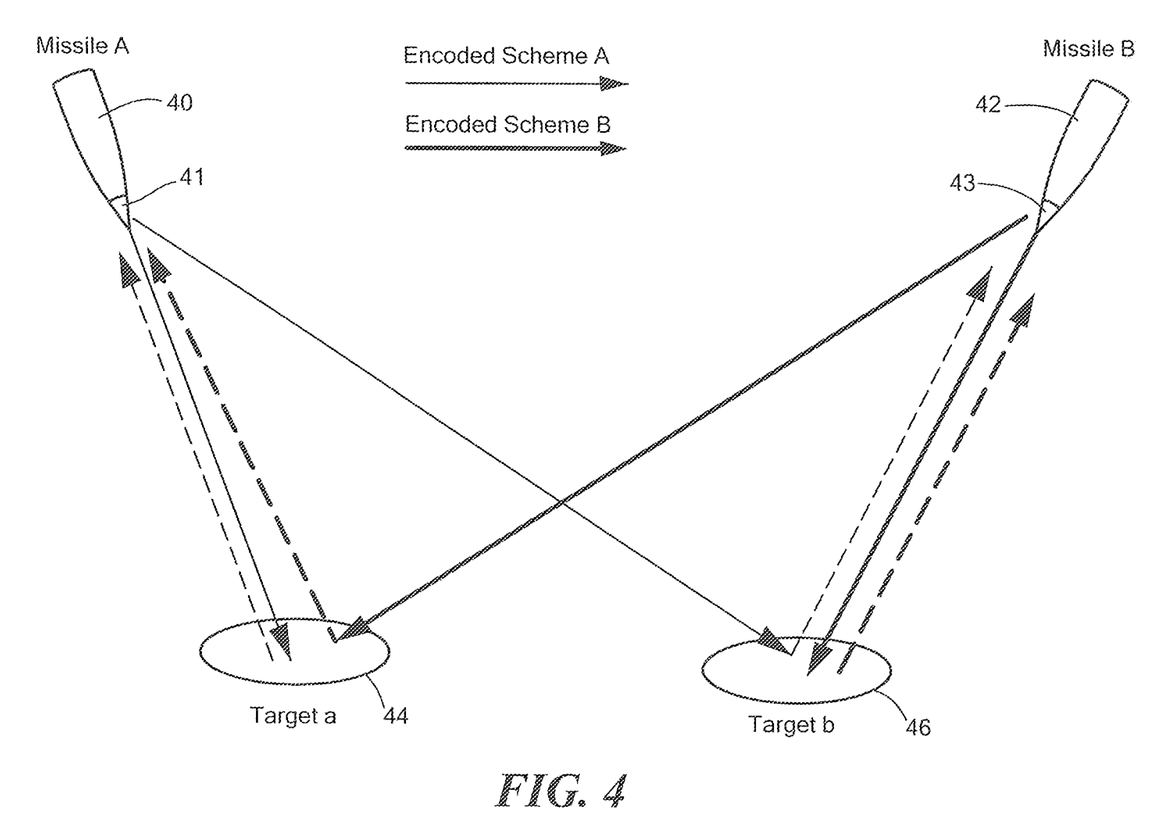
FIG. 4 is an illustration of an array of the UWB/optical apertures used for target discrimination involving multiple targets and multiple missiles.

Now referring to FIG. 4, UWB/optical apertures 41, 43 which may be the same as or similar to aperture 10 described above in conjunction with FIGS. 1-2C may be implemented in scenarios involving target discrimination. UWB/optical apertures 41, 43, may be the same or substantially similar to those described above with respect to FIGS. 1-3 and may include an optical device coupled to a region of the frequency selective apertures 41, 43. Target discrimination is generally the ability of a guidance system to identify a target in a situation where multiple targets are present. In some embodiments in which multiple targets 44, 46 and multiple missiles 40, 42 are present, the UWB/optical apertures 41, 43 can be used to ensure the missiles 40, 42 do not hit the same or wrong target 44, 46. The UWB/optical aperture 41, 43 or an array of such apertures may be coupled to a surface of the missiles (i.e., tip, nose, body) to allow the missile to identify or communicate with an intended target 44, 46.

For example, each of the missiles 40, 42 may transmit an unique encoded pulse train at the intended target 44, 46, using a laser that is transmitted through the aperture 41, 43 on a surface of the missile 40, 42. The unique encoded pulse train can be supplied from a feed network (i.e., fiber optic cable, a branch of fiber optics) that is coupled to frequency 41, 43 or an optical device formed in a region of the apertures 41, 43. In such an embodiment, each missile and target can have a unique encoded pulses per missile per target so that multiple missiles 40, 42 don't hit the same or wrong target 44, 46. The UWB/optical aperture (e.g., glass tip) allows for the passage of laser towards the intended target 44, 46 to illuminate the intended target 44, 46 with the unique encoded pulse train.

It should be appreciated that the structures and techniques described herein can be applied in existing apertures or array apertures and thus can significantly improve existing products. The structures and techniques described herein find use in applications operating in frequencies starting at 10 GHz and higher, but can also be utilized in lower frequency applications.

The systems, circuits and techniques described herein have application in a wide variety of different applications. For example, the antenna assembly may include active or passive antenna elements for missile sensors that require bandwidth, higher gain to support link margin, and wide impedance bandwidth to support higher data-rates, within a small volume. They may also be used as antennas for land-based, sea-based, or satellite communications. Because RF systems having small volume are possible due to the co-located RF/optical feed configuration described herein, the systems are well suited for use on small missile airframes. RF systems utilizing the concepts, systems and circuits described herein may also be used in, for example, handheld communication devices (e.g., cell phones, smart phones, etc.), commercial aircraft communication systems, automobile-based communications systems (e.g., personal communications, traffic updates, emergency response communication, collision avoidance systems, etc.), Satellite Digital Audio Radio Service (SDARS) communications, proximity readers and other RFID structures, radar systems, global positioning system (GPS) communications, and/or others. In at least one embodiment, the concepts, systems and circuits described herein may be adapted for use in medical imaging systems. The RF systems described herein may be used for both transmit and receive operations. Many other applications are also possible. For example, structures and techniques described herein can be applied in small devices that combine optics (cameras) and RF sensors. Another commercial application would be a cable that combines a high bandwidth fiber optic data transmission line with a backwards compatible multi-frequency RF channel. The structures and techniques described herein find use in both commercial and non-commercial (e.g. military) applications.

It should of course be understood that while the present technology has been described with respect to disclosed embodiments, numerous variations, alternate embodiments, equivalents, etc. are possible without departing from the spirit and scope of the claims. For example, any of a number of regions or optical elements may be used in the aperture.

In addition, it is intended that the scope of the present claims include all other foreseeable equivalents to the elements and structures as described herein and with reference to the drawing figures. Accordingly, the subject matter sought to be protected herein is to be limited only by the scope of the claims and their equivalents.

Having described preferred embodiments which serve to illustrate various concepts, structures and techniques, which are the subject of this patent, it will now become apparent to those of ordinary skill in the art that other embodiments incorporating these concepts, structures and techniques may be used. For example, it should be noted that individual concepts, features (or elements) and techniques of different embodiments described herein may be combined to form other embodiments not specifically set forth above. Furthermore, various concepts, features (or elements) and techniques, which are described in the context of a single embodiment, may also be provided separately or in any suitable sub-combination. It is thus expected that other embodiments not specifically described herein are also within the scope of the following claims.

Accordingly, it is submitted that that scope of the patent should not be limited to the described embodiments, but rather should be limited only by the spirit and scope of the following claims.

All publications and references cited herein are expressly incorporated herein by reference in their entirety.

What is claimed is:

1. An ultra-wide band (UWB) radio frequency (RF)/optical system comprising:
   a UWB RF/optical feed circuit having a first end and a second end;
   a UWB RF/optical waveguide aperture coupled to a first one of the first and second ends of said UWB RF/optical feed circuit, said UWB RF/optical waveguide aperture comprising:
   a substrate having first and second opposing surfaces, said substrate coupled to the first end of said UWB RF/optical feed circuit and having a plurality of regions, the plurality of regions comprising:
      a first region having a first relative dielectric constant and transparent to signals having a frequency in a first frequency range;
      a second region having a second relative dielectric constant and transparent to signals having a frequency in a second frequency range; and
      a third region having a third relative dielectric constant and transparent to signals having a frequency in a third frequency range.

2. The system of claim 1, wherein the first region corresponds to a first aperture made up of the second region and the third region.

3. The system of claim 1, wherein the second region corresponds to a second aperture made up of the third region.

4. The system of claim 1, wherein the third region corresponds to a third aperture embedded within the first and second regions.

5. The system of claim 1, wherein the first relative dielectric constant of the first region is greater than the second and third relative dielectric constants.

6. The system of claim 1, wherein the second relative dielectric constant is greater than the third relative dielectric constant for.

7. The system of claim 1, wherein the second region is provided having a rectangular shape and is disposed within an area formed by a length and a width of the first region.

8. The system of claim 1, wherein the third region is provided having a rectangular shape and is disposed within an area formed by a length and a width of the second region.

9. The system of claim 1, wherein the UWB RF/optical feed circuit comprises a waveguide and an optical signal path extending through the waveguide to a surface of the third region.

10. The system of claim 9, wherein the optical signal path comprises at least one of: optical fibers, step-index fibers, or graded index fibers.

11. The system of claim 1, wherein said substrate is disposed in the first end of the UWB RF/optical waveguide aperture such that the first surface of the substrate is flush with an end surface of the waveguide, the end defined by walls of the waveguide.

12. The system of claim 1, wherein:
   the first region has a first relative dielectric constant and is transparent to signals having a frequency in a first frequency range;
   the second region has a second relative dielectric constant which is different than the first relative dielectric constant and is transparent to signals having a frequency in a second, different frequency range; and
   the third region comprises an optical device and has a third relative dielectric constant which is different than the first relative dielectric constant and the second relative dielectric constant and is transparent to signals having a frequency in a third, different frequency range.

* * * * *